United States Patent [19]

Lu

[11] Patent Number: 4,745,463
[45] Date of Patent: May 17, 1988

[54] GENERALIZED CHROMINANCE SIGNAL DEMODULATOR FOR A SAMPLED DATA TELEVISION SIGNAL PROCESSING SYSTEM

[75] Inventor: Chung H. Lu, Plainsboro, N.J.

[73] Assignee: RCA Licensing Corporation, Princeton, N.J.

[21] Appl. No.: 911,424

[22] Filed: Sep. 25, 1986

[51] Int. Cl.[4] .............................................. H04N 9/50
[52] U.S. Cl. ......................................... 358/23; 358/13
[58] Field of Search ................................... 358/13, 23

[56] References Cited

U.S. PATENT DOCUMENTS

| | | | |
|---|---|---|---|
| 4,322,739 | 3/1982 | Drewery et al. | 358/13 |
| 4,349,833 | 9/1982 | Clarke | 358/23 |

Primary Examiner—James J. Groody
Assistant Examiner—David E. Harvey
Attorney, Agent, or Firm—P. J. Rasmussen; E. P. Herrmann; K. N. Nigon

[57] ABSTRACT

In an NTSC digital television receiver, the composite video signal is digitized with a sampling frequency of 32/13 times the color subcarrier frequency, $f_c$. The chrominance signal component of this video signal is demodulated using a pair of finite impulse responsive filters having programmable weighting factors. The weighting factors are changed in a 32 step sequence as 32 consecutive chrominance samples are applied to the filters. The circuitry which generates the weighting factors is responsive to a phase alignment signal to determine when the 32 step sequence begins.

10 Claims, 3 Drawing Sheets

GENERALIZED CHROMINANCE SIGNAL DEMODULATOR FOR A SAMPLED DATA TELEVISION SIGNAL PROCESSING SYSTEM

The present invention relates to a chrominance signal demodulator for video signals which have been sampled at a rate substantially equal to N/D times the frequency of the color subcarrier signal, where N and D are integers.

Digital and other sampled data circuitry are becoming commonplace in video signal processing apparatus. Comb filters, digital signal processing circuitry and field of frame store memories are found in equipment ranging from business teleconferencing systems to consumer television receivers. For these applications, the frequency at which the samples are developed (i.e. the sampling clock frequency) is an important consideration.

In any of these signal processing systems, several factors act to limit the frequency of the sampling clock signal. First, to ensure faithful reproduction of the video image it is desirable for the sampling clock frequency to be greater than or equal to twice the highest frequency in the video signal. Second, to simplify the separation of the luminance and chrominance signal components of the video signal, it is desirable for the sampling clock frequency to be a harmonic of the line scanning frequency. Third, to simplify the demodulation of the chrominance signal components of the video signal it is desirable for the sampling clock signal to be locked in phase to the color synchronizing burst signal component of the video signal. Fourth, to minimize the cost of the system, it is desirable to use the lowest sampling clock frequency which satisfies the first three criteria.

While there are many frequencies which satisfy these four criteria, for example 32/13 times the color subcarrier frequency, $f_c$, a sampling frequency of 4 times $f_c$ seems to be the most popular. To understand why this frequency is preferred, consider the structure of the composite video signal.

In both the NTSC and PAL television signal standards, the composite video signal consists of a luminance signal component and a chrominance signal component. The chrominance signal component is a combination of two color difference signals which modulate quadrature phase related, suppressed subcarrier signals. When the composite video signal is sampled using a clock signal that is phase-locked to the color synchronizing burst component of the video signal, the chrominance samples obtained may be represented as a function of the instantaneous amplitudes of the two baseband color difference signals and the phase angle of the sampling points with respect to a predetermined reference phase. For example, in an NTSC signal processing system in which the sampling clock signal is locked to the negative peaks of the burst signal (i.e. at the (B-Y) phase), a chrominance sample, $C_s$, may be represented by the equation (1).

$$C_s = (B\text{-}Y)\cos\phi + (R\text{-}Y)\sin\phi. \qquad (1)$$

In equation (1), $\phi$ is the phase angle between the sampling point and the (B-Y) phase of the color subcarrier signal. FIGS. 1 and 2 show a portion of the color reference burst signal component of an NTSC composite video signal, which is at the −(B-Y) phase, sampled using clock signals that are phase-locked to the negative peaks of the burst signal and having frequencies of $4f_c$ and $(32/13) f_c$ respectively.

In FIG. 1, the samples taken with the $4f_c$ clock signal occur at 90° phase intervals with respect to the (B-Y) phase of the color subcarrier signal. Thus, using equation (1), the sequence of chrominance samples may be represented as (B-Y), (R-Y), −(B-Y), −(R-Y), etc. This sequence of samples may be demodulated into sequences of samples representing the (R-Y) and (B-Y) color difference signals by separating the (R-Y) samples from the (B-Y) samples and inverting alternate samples in each of the separated sequences.

In FIG. 2, however, the sampling points occur at intervals of 146.25°. When the phase values of these sampling points are substituted into equation (1), the sequence of chrominance samples becomes:

(B-Y), (B-Y) cos 146.25° + (R-Y) sin 146.25°, (B-Y) cos 292.5° + (R-Y) sin 292.5°, (B-Y) cos 78.75° − (R-Y) sin 78.75°, ... etc.

In any sequence of 32 consecutive samples there is one (B-Y) sample, one (R-Y) sample, one −(B-Y) sample and one −(R-Y) sample. The other 28 samples in the sequence are mixtures of the (B-Y) and (R-Y) color difference signals. Consequently, it is more difficult to recover the baseband (B-Y) and (R-Y) color difference signals than it would be if the signal were samples at $4f_c$.

SUMMARY OF THE INVENTION

The present invention is embodied in circuitry for processing the chrominance signal component of a composite video signal which also includes a horizontal line synchronizing signal component. The chrominance signal includes a color information signal modulating a carrier signal. The processing circuitry which embodies the invention demodulates the chrominance signal to recover the baseband color information signal. The chrominance signal applied to the processing circuitry is sampled in synchronism with a clock signal having a frequency substantially equal to N/D times the frequency of the carrier signal, where N and D are integers. The sampled data chrominance signal is applied to a programmable sampled data filter which includes a plurality of delay stages and a plurality of programmable sample scaling circuits. The scale factors used by the programmable sample scaling circuits are changed in N steps by circuitry which is responsive to the clock signal and to a phase alignment signal. The filter provides output samples representing the baseband color information signal.

DETAILED DESCRIPTION

Figure 1:
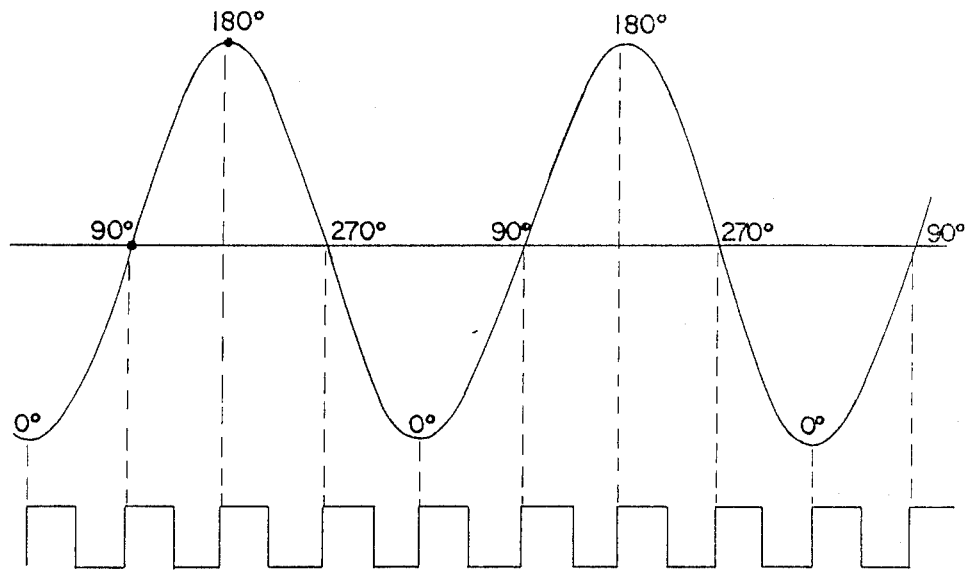
FIGS. 1 and 2 illustrate waveforms useful in explaining the operation of the invention.
Figure 2:
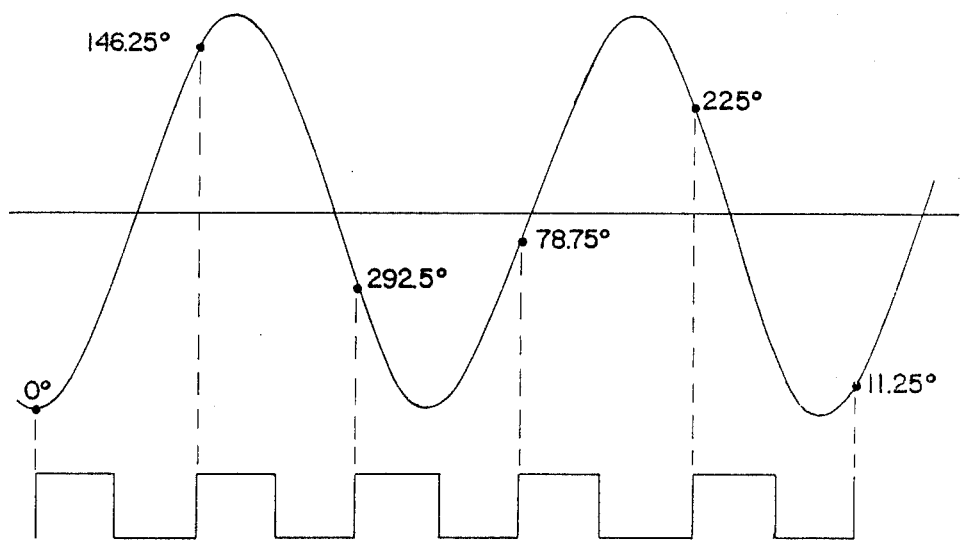

The embodiment of the invention described below is in the context of a NTSC digital television receiver. However, it is contemplated that the invention may be practiced in analog sampled data systems which use, for example, charge transfer devices and that it may also be implemented in receivers which use other signal standards, or in teleconferencing equipment or studio video signal processing equipment.

In the drawings, broad arrows represent busses for multiple-bit parallel digital signals and line arrows represent connections conveying analog signals or single bit digital signals. Depending on the processing speed of the devices, compensating delays may be required in certain of the signal paths. One skilled in the art of digital signal processing circuit design would know where such delays would be needed in a particular system.

Figure 3:
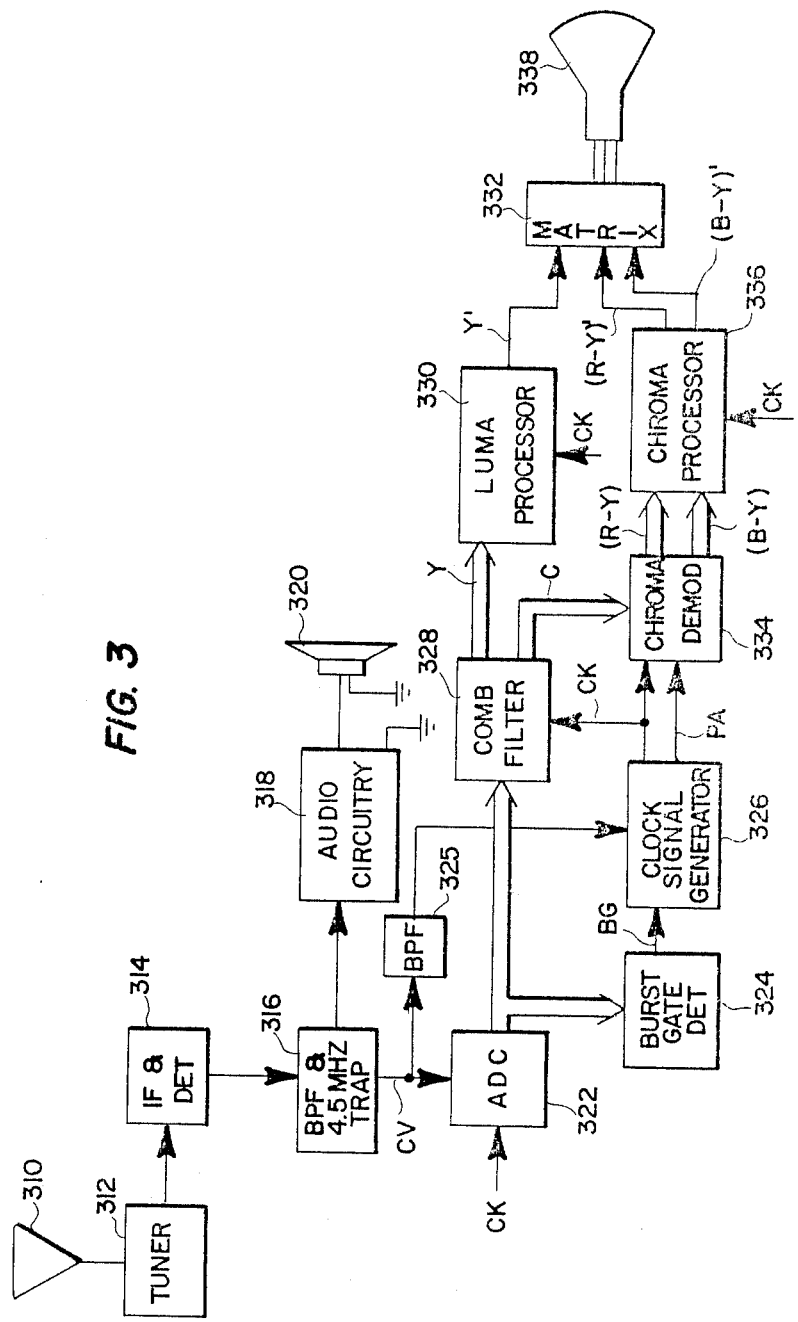
FIG. 3 is a block diagram of video signal processing apparatus including an embodiment of the present invention.

In FIG. 3, radio frequency (RF) television signals are received by an antenna 310 and applied to a tuner 312. The tuner 312, which may be of conventional design, selects an RF signal having a predetermined carrier frequency and heterodynes it with an oscillatory signal generated by a local oscillator (not shown) to develop an intermediate frequency (IF) signal. The IF signal is applied to the IF amplifier and detector circuitry 314. The circuitry 314, which may be of conventional design, amplifies the IF signal and demodulates it to provide a baseband television signal. This baseband television signal includes a video portion, which may, for example, contain luminance and chrominance signal components, occupying a band of frequencies from 0 to 4.2 MHz, and an audio portion which may, for example, consist of an audio signal modulating a 4.5 MHz carrier signal. The baseband television signals provided by the circuitry 314 are applied to band-pass filter and 4.5 MHz trap circuitry 316. The circuitry 316 processes the baseband television signals to provide the modulated audio signal component to the substantial exclusion of the video signal, at a first output terminal and the video signal component, CV, to the substantial exclusion of the modulated audio signal, at a second output terminal.

The first output terminal of the circuitry 316 couples the modulated audio signal to the audio circuitry 318. The circuitry 318, may, for example, demodulate the signal applied to its input port and amplify the resultant audio signal for application to a speaker 320.

The video signal, CV, which has a bandwidth of 4.2 MHz, is applied to an analog to digital converter (ADC) 322. The ADC 322 is responsive to a sampling clock signal CK, having a frequency of approximately 8.8 MHz to generate a sampled data signal representing the video signal CV. This clock frequency is 32/13 times the frequency, $f_c$. The clock signal CK is developed by a clock signal generator 326 described below.

The sampled data video signal provided by ADC 322 is applied to a burst gate detector 324. The detector 324 generates a burst gate signal, BG, which has pulses that coincide with the color reference burst signal in the horizontal line intervals of the video signal. The video signal, CV, provided by the band-pass filter and trap circuitry 316 is applied to a band-pass filter 325 which may, for example, remove any direct current (DC) bias from the burst signal. The filtered signal provided by the band-pass filter 325 and the burst gate signal BG are applied to the clock signal generator 326.

Figure 4:
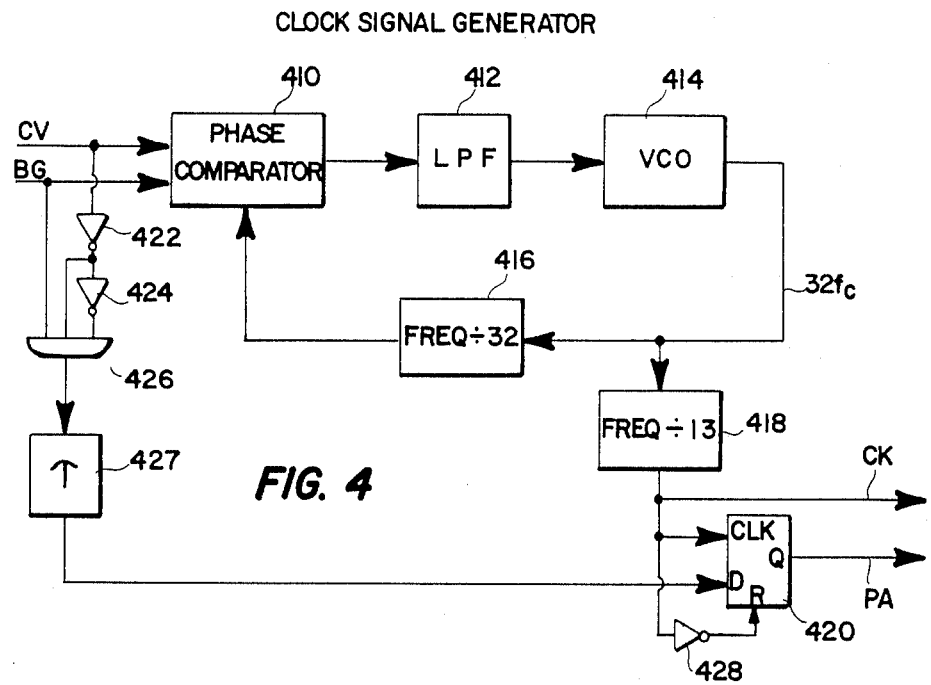
FIG. 4 is a block diagram of a clock signal generator suitable for use with the embodiment of the invention shown in FIG. 3.

FIG. 4 is a block diagram showing circuitry which may be used for the clock signal generator 326. The clock signal generator shown in FIG. 4 includes a phase-locked-loop (PLL) which comprises a gated phase comparator 410, a low-pass filter 412, a voltage controlled oscillator (VCO) 414 and a frequency divider 416. The phase comparator 410 compares an oscillatory signal provided by the frequency divider 416 to the video signal CV during the burst interval defined by the gating signal BG. A phase difference signal, generated by the phase comparator 410, is applied to the low-pass filter 412 which may, for example, integrate the phase difference signal to develop a frequency control signal for the VCO 414. The VCO 414, which has a free running frequency of approximately 32 $f_c$, produces an oscillatory signal that is applied to the frequency divider circuitry 416. The circuitry 416 divides the frequency of the signal provided by the VCO 414 by 32 to produce a signal having a frequency of $f_c$, the same frequency as the color synchronizing burst signal, for application to the phase comparator 410. The gain factors of the individual elements of the PLL are chosen, for example, to achieve a loop time constant of from 12 line periods to one field period.

The signal provided by the VCO 414, which has a nominal frequency of 32 $f_c$ is applied to frequency dividing circuitry 418. The circuitry 418 divides the frequency of this signal by 13 to produce the signal CK having a frequency of (32/13) $f_c$.

The clock signal CK, the video signal CV and the burst gate signal BG are applied to circuitry which generates a phase alignment signal PA. This signal is used by the chrominance demodulator circuitry as explained below in reference to FIG. 5. The signal CV is applied to a first inverter, 422, which, during the burst interval, provides, for example, a square-wave output signal having pulses that have a predetermined phase relationship relative to the (B-Y) phase of the chrominance signal. This signal is inverted by a second inverter 424 and delayed by the signal propogation delay through the inverter 424. The burst gate signal, BG, and the output signals of the inverters 422 and 424 are applied to an AND gate 426. The AND gate 426 produces a signal which has short-duration pulses. This signal is delayed by a delay element 427 to provide a signal having pulses that correspond to the (B-Y) sampling phase. The signal provided by the delay element 427 is applied to the D input terminal of a flip-flop 420. The clock signal CK is applied to the clock input terminal of the flip-flop 420 and, through an inverter, 428, to the reset terminal, R, of the flip-flop. When the leading edge of a clock pulse coincides with a pulse from the AND gate 426, the output signal, PA, of the flip-flop 420 is a logic one for one-half of one period of the signal CK. This signal indicates that a sampling clock pulse at the (B-Y) phase of the chrominance signal has occurred.

Referring to FIG. 3, the digitized video signal provided by the ADC 322 and the clock signal CK are applied to a comb filter 328. The filter 328, which may be of conventional design, separates the video signal into a luminance signal, Y, and a chrominance signal, C. The signal Y is applied to a luminance signal processor 330 which may, for example, include circuitry for peaking the high frequency components of the luminance signal and for converting the digital luminance signal into an analog signal Y'. The signal Y' is applied to a conventional matrix circuit 332 which combines the signal Y' with color difference signals (R-Y)' and (B-Y)' to produce red, green and blue primary color signals (R, G and B respectively) for application to a display device 338. The (R-Y)' and (B-Y)' color difference signals are generated from the chrominance signal C by the chrominance signal demodulator 334 and the chrominance signal processor 336.

Figure 5:
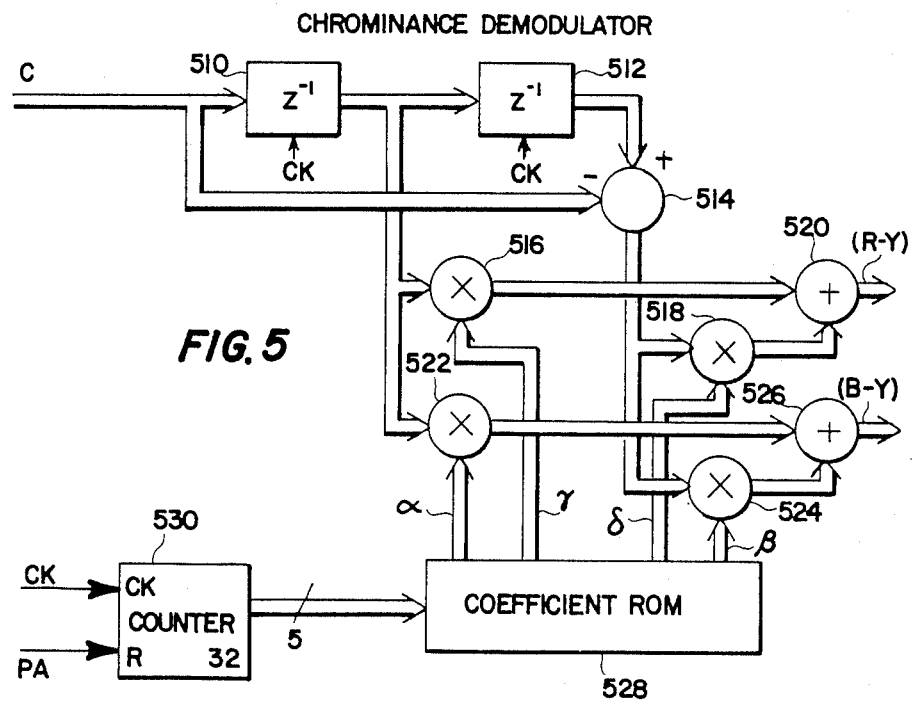
FIG. 5 is a block diagram of a chrominance signal demodulator embodying the present invention.

FIG. 5 is a block diagram showing exemplary circuitry for the chrominance signal demodulator 334. The chrominance signal C is applied to the input port of a delay element 510, the output port of which is coupled to the input port of a delay element 512. Each of the delay elements 510 and 512 delays the samples applied to its input port by one period of the signal CK. The sample available at the output port of the delay element 510 is multiplied by the scale factors α and γ in the respective sample scaling circuits 522 and 516. The sample applied to the input port of the delay element 510 is subtracted from the sample available at the output port of the delay element 512 by the subtracter 514. The difference sample generated by the subtracter 514 is multiplied by the scale factors β and δ in the respective sample scaling circuits 524 and 518. The samples provided by the scaling circuits 516 and 518 are summed by an adder 520 to generate samples representing the (R-Y) color difference signal and the samples provided by the scaling circuits 522 and 524 are summed by the adder 526 to generate samples representing the baseband (B-Y) color difference signal. The scale factors α, β, γ and δ are provided by a coefficient read only memory (ROM) 528 in response to a five-bit control signal generated by a modulo 32 counter 530 and applied to the address input port of the ROM 528. This control signal is set to zero by the phase alignment signal PA, which is applied to the reset input terminal of the counter 530, and is incremented by one for every pulse of the signal CK. Since the counter 530 is a modulo 32 counter, the control signal is reset to zero on the clock pulse following the value 31 even in the absence of a pulse of the signal PA. Accordingly, each of the scale factors provided by the ROM 528 changes in a cycle of 32 values as the address values provided by the counter 530 change from 0 to 31. Exemplary values of the scale factors α, β, γ and δ are listed in Table I.

TABLE I

| Counter Value | α | β | γ | δ |
|---|---|---|---|---|
| 0 | 1 | 0 | 0 | −0.90 |
| 1 | −0.83 | 0.50 | 0.56 | 0.75 |
| 2 | 0.38 | −0.83 | −0.92 | −0.34 |
| 3 | 0.20 | 0.88 | 0.98 | −0.18 |
| 4 | −0.71 | −0.64 | −0.71 | 0.64 |
| 5 | 0.98 | 0.18 | 0.20 | −0.88 |
| 6 | −0.92 | 0.34 | 0.38 | 0.83 |
| 7 | 0.56 | −0.75 | −0.83 | −0.50 |
| 8 | 0 | 0.90 | 1 | 0 |
| 9 | −0.56 | −0.75 | −0.83 | 0.50 |
| 10 | 0.92 | 0.34 | 0.38 | −0.83 |
| 11 | −0.98 | 0.18 | 0.20 | 0.88 |
| 12 | 0.71 | −0.64 | −0.71 | −0.64 |
| 13 | −0.20 | 0.88 | 0.98 | 0.18 |
| 14 | −0.38 | −0.83 | −0.92 | 0.34 |
| 15 | 0.83 | 0.50 | 0.56 | −0.75 |
| 16 | −1 | 0 | 0 | 0.9 |
| 17 | 0.83 | −0.50 | −0.56 | −0.75 |
| 18 | −0.38 | 0.83 | 0.92 | 0.34 |
| 19 | −0.20 | −0.88 | −0.98 | 0.18 |
| 20 | 0.71 | 0.64 | 0.71 | −0.64 |
| 21 | −0.98 | −0.18 | −0.20 | 0.88 |
| 22 | 0.92 | −0.34 | −0.38 | −0.83 |
| 23 | −0.56 | 0.75 | 0.83 | 0.50 |
| 24 | 0 | −0.90 | −1 | 0 |
| 25 | 0.56 | 0.75 | 0.83 | −0.50 |
| 26 | −0.92 | −0.34 | −0.38 | 0.83 |
| 27 | 0.98 | −0.18 | −0.20 | −0.88 |
| 28 | −0.71 | 0.64 | 0.71 | 0.64 |
| 29 | 0.20 | −0.88 | −0.98 | −0.18 |
| 30 | 0.38 | 0.83 | 0.92 | −0.34 |
| 31 | −0.83 | −0.50 | −0.56 | 0.75 |

Referring to FIG. 3, the (R-Y) and (B-Y) signals provided by the chrominance demodulator 334 are applied to a chrominance processor 336. The processor 336 may include, for example, auto-flesh correction circuitry and digital-to-analog converters which develop the analog color difference signals (R-Y)' and (B-Y)' for application to the matrix 332 as set forth above.

The chrominance demodulator circuitry shown in FIG. 5 includes two FIR filters having transfer functions $T_{(R-Y)}$ and $T_{(B-Y)}$ which may be represented in Z-transform notation as:

$$T_{(B-Y)} = -\beta + \delta Z^{-1} + \beta Z^{-2} \quad (2)$$

and $$T_{(R-Y)} = -\delta + \gamma Z^{-1} + \delta Z^{-2}. \quad (3)$$

Each of these filters develops an estimate of the values of its output color difference signal samples from the values of three consecutive chrominance samples.

In the present embodiment of the invention, the chrominance signal is a sampled data signal having a sampling frequency of $(32/13)f_c$. The phase angle between successive samples is $13\pi/16$ and the phase of a sample with respect to a predetermined initial phase repeats every 32 samples (13 cycles of the subcarrier signal). If the initial phase is the (B-Y) phase, the value of any chrominance sample $C_m$ may be described by the equation (4) which is derived from the equation (1).

$$C_m = (B-Y)_m \cos n\Delta + (R-Y)_m \sin n\Delta \quad (4)$$

where n is the number of samples between the mth sample and the last (B-Y) sample, $\Delta$ is $13\pi/16$ and $(B-Y)_m$ and $(R-Y)_m$ are the values of the (B-Y) and (R-Y) color difference signal components of the chrominance sample $C_m$.

Since the color difference signal components of the chrominance signal have nominal bandwidths less than 1.2 MHz and, since the sampling frequency is approximately 8.8 MHz, the values of the color difference signal components of any three consecutive samples are approximately the same (e.g. $(B-Y)_{m-1} \cong (B-Y)_m \cong (B-Y)_{m+1}$). The estimation method used by the present invention assumes that $(B-Y)_{m-1} = (B-Y)_m = (B-Y)_{m+1}$ and that $(R-Y)_{m-1} = (R-Y)_m = (R-Y)_{m+1}$ for an arbitrary sample m. Using this assumption and the equation (4), (B-Y) and (R-Y) can be stated in terms of $C_{m-1}$, $C_m$, $C_{m+1}$, n and $\Delta$ as follows.

$$(B-Y)_m = \tfrac{1}{2}(\sin n\Delta / \sin \Delta)(C_{m-1} - C_{m+1}) + \cos n\Delta C_m \quad (5)$$

and $$(R-Y)_m = -\tfrac{1}{2}(\cos n\Delta / \sin \Delta)(C_{m-1} - C_{m+1}) + \sin n\Delta C_m. \quad (6)$$

The chrominance demodulator circuitry shown in FIG. 5 implements the equations (5) and (6). The scale factors α, β, γ and δ are defined by the equations:

$$\alpha = \cos n\Delta \quad (7)$$

$$\beta = \tfrac{1}{2}(\sin n\Delta / \sin \Delta) \quad (8)$$

$$\gamma = \sin n\Delta \quad (9)$$

$$\delta = -\tfrac{1}{2}(\cos n\Delta / \sin \Delta) \quad (10)$$

where n increases incrementally from 0 to 31 and $\Delta = 13\pi/16$.

While the present embodiment of the invention uses a sampled data chrominance signal having a sampling frequency of $(32/13)f_c$, it is contemplated that similar circuitry may be designed for use with chrominance signals having sampling frequencies of $(N/D)f_c$ where N is an even integer and D is a factor of twice the ratio of the color subcarrier frequency, $f_c$, to the horizontal line scanning frequency, $f_h$. The chrominance signal demodulator used in these alternate embodiments would be structurally the same as the circuitry shown in FIG. 5, however, the modulus of the scale factor sequence and values of the individual scale factors supplied by the ROM 528 would change. Each of the coefficients $\alpha$, $\beta$, $\gamma$ and $\delta$ would have N values which may be determined by applying the equation (7)–(10) where n goes from 0 to N−1 and $\Delta = (D/N)2\pi$. Moreover, the chrominance signal demodulator described above may be used with chrominance signals having sampling frequencies of $(N/D)f_c$ where N and D have no other restrictions than that both are integers. In this instance, the coefficients $\alpha$, $\beta$, $\gamma$ and $\delta$ have values determined by the equations 7–10 and the number of values in the cycle is the number of samples between two sampling clock pulses that have the same sampling phase value.

What is claimed is:

1. In a system for processing video signals which include a horizontal line synchronizing signal component and a chrominance signal component including a baseband color information signal that modulates a carrier signal, apparatus comprising:

means, coupled to receive said video signals, for generating a sampled data signal representing said chrominance signal component and having a sampling frequency substantially equal to N/D times the frequency of said carrier signal where N and D are positive integers; and means coupled to said sampled data chrominance signal generating means for demodulating said sampled data chrominance signal to provide said baseband color information signal, including:

delay means, coupled to said sampled data chrominance signal generation means, for delaying the samples provided thereby by first and second amounts of time substantially equal to one and two periods of said sampling frequency respectively, to provide respective first and second delayed samples;

means for combining successive samples provided by said sampled data chrominance signal generation means with successive ones of said second delayed samples to generate successive compound samples;

means for multiplying successive ones of said first delayed samples by respective proportioning factors to generate respective successive proportional samples;

means for combining said successive proportional samples with said successive compound samples to generate successive samples representing said baseband color information signal; and means for changing the proportioning factors in a predetermined sequence having N steps corresponding respectively to N successive samples provided by said sampled data chrominance signal generation means.

2. In a system for processing video signals which include a horizontal line synchronizing signal component and a chrominance signal component including a baseband color information signal that modulates a color subcarrier signal, apparatus comprising:

a source of clock signal having a frequency substantially equal to N/D times the frequency of said color subcarrier signal where N is an even integer and D is an integer factor of an integer value corresponding to substantially twice the ratio of the frequency of the color subcarrier signal to the frequency of the horizontal line synchronizing signal component of the video signal;

means, coupled to receive said video signal and responsive to said clock signal for generating a sampled data chrominance signal representing said chrominance signal component and having sampling instants determined by said clock signal; and means, coupled to said sampled data chrominance signal generating means, for demodulating said sampled data chrominance signal to provide said baseband color information signal, including:

means, coupled to said sampled data chrominance signal generating means, for providing, at respective first and second output terminals, first and second samples of said sampled data chrominance signal that are delayed by respective first and second amounts of time with respect to the samples provided by said sampled data chrominance signal generating means;

sample subtracting means, coupled to the second output terminal of said sample delaying means, for generating samples having values proportional to the difference between the values of the samples provided thereby and values of the samples provided by said sampled data chrominance signal generating means;

means, coupled to the first output terminal of said sample delaying means and to said sample subtracting means, for scaling the respective samples provided thereby by first and second scale factors respectively to develop first and second scaled samples, wherein the values of said first and second scale factors change in N steps in synchronism with said clock signal; and means, coupled to said sample scaling means, for combining the first and second scaled samples provided thereby to generate samples representing said baseband color information signal.

3. The apparatus set forth in claim 2 wherein said first and second scale factors are generated by circuitry responsive to said clock signal and to a phase alignment signal having pulses which indicate the coincidence of a pulse of said clock signal and a predetermined phase value of said color subcarrier signal.

4. The apparatus set forth in claim 3 wherein said first and second scale factors, $\alpha$ and $\beta$ respectively, have values defined by the respective equations:

$$\alpha = \cos(n\Delta)$$

and $$\beta = \tfrac{1}{2}(\sin(n\Delta))/\sin(\Delta)$$

where $\Delta$ is an angle substantially equal to the difference in the phase of the color subcarrier at instants determined by two consecutive pulses of said clock signal and n is an integer number of pulses of said clock signal which have occurred since the occurrence of a pulse of said phase alignment signal.

5. The apparatus set forth in claim 4 wherein said sample delaying means provides said first and second samples of said sampled data chrominance signal that are delayed by one and two periods of said clock signal, respectively.

6. In a system for processing video signals which include a horizontal line synchronizing signal component and a chrominance signal component including a baseband color information signal that modulates a color subcarrier signal, apparatus comprising:

means, coupled to receive said video signals, for generating a sampled data signal representing said chrominance signal component and having a sampling frequency substantially equal to N/D times the frequency of said color subcarrier signal, where N is an even integer and D is an integer factor of an integer value corresponding substantially to twice the ratio of the frequency of the color subcarrier signal to the frequency of the horizontal line synchronizing signal component of the video signal; and means coupled to said sampled data chrominance signal generating means for demodulating said sampled data chrominance signal to provide said baseband color information signal, including:

sample estimating means coupled to receive said sampled data chrominance signal having a transfer function T defined by the equation:

$$T = -\beta + \alpha Z^{-1} + \beta Z^{-2}$$

where $Z^{-1}$ is the Z-transform variable representing a delay substantially equal to one period of a clock signal having a frequency substantially equal to the sampling frequency, and $\alpha$ and $\beta$ are scale factors which change in N steps coincident with the application of N successive samples of said sampled data chrominance signal to said sample estimating means, wherein said sample estimating means provides an output signal representing said baseband color information signal.

7. The apparatus set forth in claim 6 wherein said scale factors, $\alpha$ and $\beta$, are generated by circuitry responsive to said clock signal and to a phase alignment signal having pulses which indicate the coincidence of a pulse of said clock signal and a predetermined phase value of said color subcarrier signal.

8. The apparatus set forth in claim 7 wherein said scale factors $\alpha$ and $\beta$ have values defined by the respective equations:

$$\alpha = \cos(n\Delta)$$

and $$\beta = \tfrac{1}{2}(\sin(n\Delta))/\sin(\Delta)$$

where $\Delta$ is an angle substantially equal to the difference in phase of the color subcarrier signal at instants determined by two consecutive pulses of said clock signal and n is an integer number of pulses of said clock signal which have occurred since the occurrence of a pulse of said phase alignment signal.

9. The apparatus set forth in claim 8 wherein:

said chrominance signal component of said video signal includes a further baseband color information signal modulating a further color subcarrier signal being quadrature phase related to said color subcarrier signal;

said chrominance signal demodulating means includes further sample estimating means coupled to receive said sampled data chrominance signal having a transfer function $T_F$ defined by the equation:

$$T_F = \delta + \gamma Z^{-1} + \delta Z^{-2}$$

where $Z^{-1}$ is the Z-transform variable representing a delay substantially equal to one period of the clock signal and $\gamma$ and $\delta$ are scale factors which change in N steps coincident with the application of N successive samples of said sampled data chrominance signal to said further sample estimating means, wherein said further sample estimating means provides an output signal representing said further baseband color information signal.

10. The apparatus set forth in claim 9 wherein said scale factors $\gamma$ and $\delta$ have values defined by the respective equations:

$$\gamma = \sin(n\Delta)$$

and $$\delta = -\tfrac{1}{2}(\cos(n\Delta))/\sin(\Delta).$$

* * * * *